(12) United States Patent
Hunt et al.

(10) Patent No.: US 7,565,300 B2
(45) Date of Patent: Jul. 21, 2009

(54) SYSTEM AND METHOD FOR HIERARCHICALLY PRICING ITEMS

(75) Inventors: William A Hunt, Pittsburgh, PA (US); Jennifer Menicucci, Pittsburgh, PA (US); Susan M O'Connell, Elmira, NY (US)

(73) Assignee: MedCom Solutions, Inc., Pittsburgh, PA (US)

( * ) Notice: Subject to any disclaimer, the term of this patent is extended or adjusted under 35 U.S.C. 154(b) by 15 days.

(21) Appl. No.: 11/836,856

(22) Filed: Aug. 10, 2007

(65) Prior Publication Data

US 2008/0040154 A1 Feb. 14, 2008

Related U.S. Application Data

(60) Provisional application No. 60/822,010, filed on Aug. 10, 2006.

(51) Int. Cl.
G06Q 50/00 (2006.01)
A61B 5/00 (2006.01)

(52) U.S. Cl. .............................................. 705/2; 705/3
(58) Field of Classification Search ................. 705/2–3
See application file for complete search history.

(56) References Cited

U.S. PATENT DOCUMENTS

| | | | |
|---|---|---|---|
| 5,325,293 A * | 6/1994 | Dorne ........................... | 705/2 |
| 5,873,069 A | 2/1999 | Reuhl | |
| 5,960,407 A | 9/1999 | Vivona | |
| 5,987,425 A | 11/1999 | Hartman | |
| 6,507,822 B1 | 1/2003 | Walker | |
| 6,826,538 B1 | 11/2004 | Kalyan | |
| 6,850,903 B2 | 2/2005 | Levine | |
| 6,910,017 B1 | 6/2005 | Woo | |
| 6,965,867 B1 | 11/2005 | Jameson | |
| 7,010,494 B2 | 3/2006 | Etzioni | |
| 7,020,617 B2 | 3/2006 | Ouiment | |
| 7,062,447 B1 | 6/2006 | Valentine | |
| 7,346,522 B1 * | 3/2008 | Baylor et al. .................. | 705/3 |
| 2001/0032196 A1 | 10/2001 | Krespi | |
| 2002/0004789 A1 | 1/2002 | Huyler | |
| 2002/0026368 A1 | 2/2002 | Carter | |
| 2002/0046128 A1 | 4/2002 | Abe | |
| 2002/0065717 A1 | 5/2002 | Miller | |
| 2002/0072956 A1 | 6/2002 | Willems | |
| 2002/0073051 A1 | 6/2002 | Blouin | |

(Continued)

FOREIGN PATENT DOCUMENTS

WO   WO 01/93067   12/2001

(Continued)

OTHER PUBLICATIONS

Dennison, Mike. "Hospital Bills Sometimes Confound Even the Experts." Knight-Ridder Tribune Business News—The Montana Standard. Sep. 3, 2006.*

Primary Examiner—C. Luke Gilligan
Assistant Examiner—Kristine K Rapillo
(74) Attorney, Agent, or Firm—Alicia M. Passerin, Esq.; Cohen & Grigsby, P.C.

(57) ABSTRACT

A computer-assisted method for hierarchically pricing chargeable items in a healthcare provider's chargeable item database is disclosed. The method applies hierarchical pricing to related chargeable items. A system for hierarchically pricing related chargeable items is also disclosed.

32 Claims, 2 Drawing Sheets

U.S. PATENT DOCUMENTS

| | | |
|---|---|---|
| 2002/0095327 A1 | 7/2002 | Zumel |
| 2002/0099596 A1 | 7/2002 | Geraghty |
| 2002/0165834 A1 | 11/2002 | Delurgio |
| 2002/0178109 A1 | 11/2002 | Bye |
| 2002/0188576 A1 | 12/2002 | Peterson |
| 2002/0194143 A1 | 12/2002 | Banerjee |
| 2003/0110066 A1 | 6/2003 | Walser |
| 2003/0126097 A1 | 7/2003 | Zhang |
| 2003/0177103 A1 | 9/2003 | Ivanov |
| 2003/0200185 A1 | 10/2003 | Huerta |
| 2003/0217016 A1 | 11/2003 | Pericle |
| 2003/0229502 A1 | 12/2003 | Woo |
| 2004/0024715 A1 | 2/2004 | Ouiment |
| 2004/0049470 A1 | 3/2004 | Ouimet |
| 2004/0068413 A1 | 4/2004 | Musgrove |
| 2004/0073520 A1 | 4/2004 | Eskandari |
| 2004/0128163 A1 * | 7/2004 | Goodman et al. ............... 705/2 |
| 2004/0128261 A1 | 7/2004 | Olavson |
| 2004/0199417 A1 | 10/2004 | Baxter |
| 2004/0205031 A1 | 10/2004 | Cranner |
| 2004/0243438 A1 | 12/2004 | Mintz |
| 2004/0249769 A1 | 12/2004 | Mathews |
| 2004/0267674 A1 | 12/2004 | Feng |
| 2005/0004819 A1 | 1/2005 | Etzioni |
| 2005/0071249 A1 | 3/2005 | Nix |
| 2005/0086181 A1 | 4/2005 | Melzer |
| 2005/0131810 A1 | 6/2005 | Garrett |
| 2005/0149381 A1 | 7/2005 | Ravulapati |
| 2005/0149458 A1 | 7/2005 | Eglen |
| 2005/0171918 A1 | 8/2005 | Eden |
| 2005/0197971 A1 | 9/2005 | Kettner |
| 2005/0256810 A1 | 11/2005 | Lund |
| 2005/0273415 A1 | 12/2005 | Mathews |
| 2006/0010082 A1 | 1/2006 | Gee |
| 2006/0047574 A1 | 3/2006 | Sundaram |
| 2006/0047608 A1 | 3/2006 | Davis |
| 2006/0059010 A1 | 3/2006 | Chavis-Smith |
| 2006/0080265 A1 | 4/2006 | Hinds |
| 2006/0106678 A1 | 5/2006 | Walker |

FOREIGN PATENT DOCUMENTS

| | | |
|---|---|---|
| WO | WO 02/10961 | 2/2002 |
| WO | WO 2005/059685 | 6/2005 |

* cited by examiner

SYSTEM AND METHOD FOR HIERARCHICALLY PRICING ITEMS

CROSS REFERENCE TO RELATED APPLICATION

This application claims priority to U.S. Provisional Patent Application No. 60/822,010 filed on Aug. 10, 2006.

BACKGROUND

Computerized methods for reviewing a healthcare provider's chargeable item database are known in the art. Often times, chargeable items are hierarchically related, yet the pricing scheme for the related chargeable items is not reflective of this hierarchy. Such inconsistent pricing schemes generally mean that either the consumer is being overcharged for some of the chargeable items or that the healthcare provider is not charging enough for other chargeable items. Therefore, both consumers and healthcare providers alike have an interest in ensuring that the prices charged for related chargeable items reflect any hierarchical relationship between the related chargeable items.

SUMMARY

A computer-assisted method of hierarchical pricing is disclosed. The method comprises the step of searching a hierarchy for a selected procedural code, the hierarchy comprising a group of related procedural codes. Each procedural code in the group corresponds to a chargeable item. The procedural codes within each group are ranked to reflect a relationship between the chargeable items. The method further comprises the step of searching a healthcare provider's chargeable item database to identify any of the procedural codes in the group that are entered in the chargeable item database. The rank of each identified procedural code in the hierarchy is compared to an order of the chargeable items having the identified procedural codes in the chargeable item database when the chargeable items are ordered according to price.

DETAILED DESCRIPTION

Figure 1:
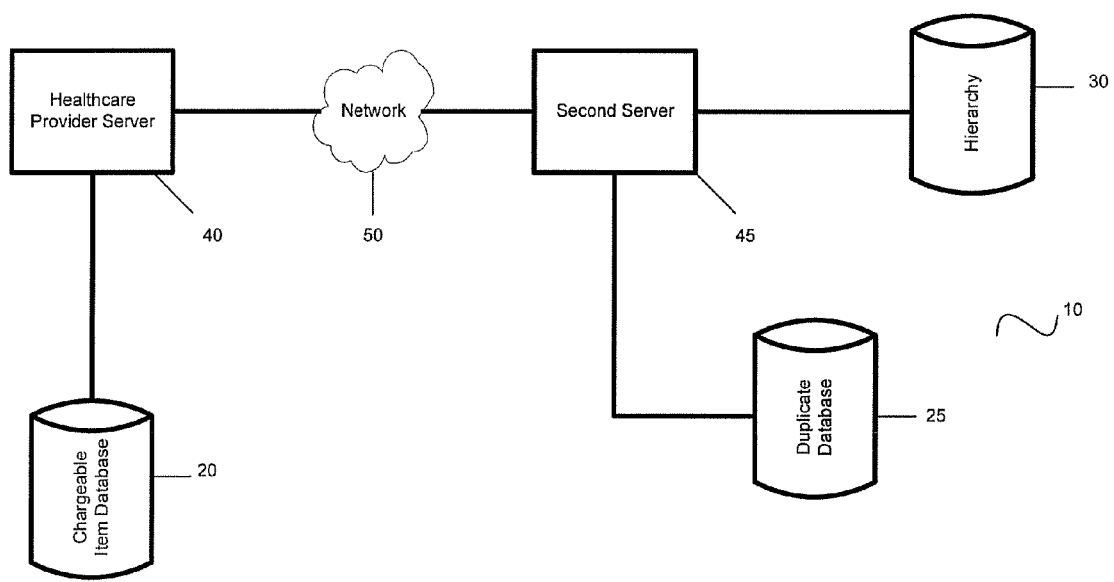
FIG. 1 shows an embodiment of a system.

In an embodiment, a system 10 of hierarchically pricing related chargeable items provided by a healthcare provider is disclosed. In an example, the system 10 is embodied in a computer system such as the one shown in FIG. 1, which shows an example of a system 10 that comprises at least one processor that uses at least one set of instructions to implement hierarchical pricing of related chargeable items. The components contained in the computer system of FIG. 1 may be those found in general purpose computer systems and the illustrated components are intended to represent a broad category of such computer components.

As described in more detail below, embodiments of the system 10 search a hierarchy comprising a plurality of procedural codes for a selected procedural code, each code corresponding to a chargeable item, to compare the rank of the procedural code within the hierarchy to an order of the chargeable items having the identified procedural codes in the chargeable item database when the chargeable items are ordered according to price. The results of the comparison are optionally summarized in a report that reports any pricing discrepancies based on the comparison to the hierarchy, described in more detail below. The results may also be used to update the prices charged by the healthcare provider for at least one of the chargeable items having the selected procedural code so that the charged prices are ordered according to rank.

Chargeable items are, for example, chargeable supplies and services provided by or on behalf of the healthcare provider. In examples, chargeable items are technical chargeable items such as healthcare provider charges for services and supplies or professional chargeable items such as physician service charges. Data entries for each chargeable item are stored in a chargeable item database 20 that is capable of being updated. In an example, the chargeable item database 20 is the healthcare provider's Chargemaster, which is a comprehensive and healthcare provider-specific listing of each item that could be billed to a patient. In another example, the chargeable item database 20 is the healthcare provider's Service Master, which is a comprehensive and healthcare provider-specific listing of each professional service that could be billed to a patient. In another example, the chargeable item database 20 is the healthcare provider's product list. Preferably, the chargeable item database 20 is stored on a computer-readable storage medium (healthcare provider's server) 40 and is coded in a form suitable for processing. Data entries include, for example, an identifier that uniquely identifies each chargeable item and the price charged for the chargeable item. Other examples of data entries for each chargeable item include the name of or designation indicating the department within the healthcare provider that provides the chargeable item or a description of the chargeable item. Optionally, an alpha or numeric procedural code is also assigned to at least one of the chargeable items. Procedural codes are derived from a coding system that assigns a procedural code to chargeable items. In an example, the coding system is an internal coding system that is created by or for the healthcare provider. In another example, the coding system is a published system used within the healthcare industry, such as the Current Procedural Terminology (CPT®) codes that are used to designate procedures or services provided by a physician,[1,2] the HCFA Common Procedure Coding System (HCPCS) codes published by Medicare that are used to designate particular supplies or services provided by a healthcare provider, or the International Classification of Diseases codes published by the World Health Organization. In another example, the coding system is derived from published codes developed by private insurance carriers or HMOs. An example of data entries for four related chargeable items is shown in Table 1.

[1] CPT® is a registered trademark of the American Medical Association.
[2] *Current Procedural Terminology* is a copyright 2005 American Medical Association. All Rights Reserved. No fee schedules, basic units, relative values, or related listings are included in CPT. The AMA assumes no liability for the data contained therein. Applicable FARS/DFARS restrictions apply to government use.

Optionally, as shown in Table 1, one of the data entries for at least one of the related chargeable items is an exclusionary code that flags that chargeable item to be excluded from comparison, updates, and/or hierarchical pricing. In an example, an item having an exclusionary code is designated by the code "True" or "T" and an item not having an exclusionary code is designated by the code "False" or "F." Reasons for exclusion include but are not limited to: (1) the charged price is manually set by the healthcare provider; (2) there is no sales volume or gross revenue data for the chargeable item; and (3) the healthcare provider has designated that the charged price for the chargeable item be maintained.

The chargeable item database 20 is capable of being updated. Updates include changes to the data entries for chargeable items, including price. Updates are made either manually or by a processor that uses a set of computer-coded instructions stored in a computer-readable storage medium 45 to implement the update. In an example, the comparison described above identifies pricing discrepancies, such as where one chargeable item is priced higher than it should be based on its rank in the hierarchy. Optionally, the pricing discrepancy may be addressed by a user of the system who then manually updates the charged price to reflect the chargeable item's position within the hierarchy. In another example, the pricing discrepancy may be addressed electronically by instructions that use an algorithm to calculate price based on rank and other factors.

Each procedural code is optionally assigned to a group within a hierarchy 30. The group is optionally designated by a group identifier that designates a group of related chargeable items. The group identifier may be an alpha or numeric code or designation. Each group comprises related procedural codes that correspond to the related chargeable items. Procedural codes comprising the group are ranked to reflect the relationship between the chargeable items. The rank of each procedural code within the group may be designated by a rank identifier that is an alpha or numeric code or designation. In an example, the hierarchy 30 comprises a plurality of groups. In an example, the hierarchy is stored in a database that is stored on a computer-readable storage medium 45 and coded in a form suitable for processing. In an example, the storage medium is the server 40 on which the chargeable item database is stored. In another example, the storage medium is a second storage medium 45 as shown in FIG. 1. In another example, the hierarchy is stored as a data entry in the chargeable item database 20. The hierarchy 30 is capable of being updated. An example of the hierarchy 30 is shown in Table 1, described in more detail below.

In an embodiment, the hierarchy 30 is created by assigning two or more related procedural codes to a group and ranking the procedural codes within the group in an order that reflects the relationship of the chargeable items to which the procedural codes correspond. The hierarchy 30 may be created manually or automatically, such as by searching the chargeable item database 20 to identify related chargeable items and the procedural codes that correspond thereto. The hierarchy 30 may be a utilization file that is created by or for the healthcare provider and that is uploaded to the computer-readable storage media 45 or to the chargeable item database 20. In an example, the hierarchy 30 is reviewed or updated at regular time intervals, such as daily, weekly, monthly, quarterly, or annually, in an effort to ensure that procedural codes are correctly grouped and ranked.

If the system 10 is implemented in software, the storage medium 45 stores the executable code when in operation. The main memory may include banks of dynamic random access memory as well as high-speed capable memory. Where the system 10 is a computer system, the processor may contain a single microprocessor, or may contain a plurality of microprocessors for configuring the computer as a multi-processor system. The processor uses the instructions to process the review, such as by converting a request for a review of the hierarchical pricing in the chargeable item database to a readable format, including those that are computer-readable, readable by a user of the system, or a combination thereof. In an example, a parser program imports a request to compare the pricing order of chargeable items with the hierarchy into the processor and the processor uses instructions to convert the request into a readable format.

The processor uses instructions to search the hierarchy for a selected procedural code and to identify the group to which the selected procedural code is assigned. The processor then uses instructions to search that group to identify other related procedural codes also assigned thereto. Next, the processor uses instructions to search the chargeable item database 20 to identify any of the procedural codes in the identified group that are entered in the chargeable item database 20. Using instructions, the processor compares the rank of procedural codes in the group of the hierarchy 30 to an order of chargeable items to which those procedural codes correspond when the chargeable items are ordered according to price. In an example, chargeable items are ordered according to price in an ascending order, and in another example, the order is according to price in a descending order.

Optionally, the processor uses instructions to generate a report that summarizes the comparison of the rank of each of the identified procedural codes in the hierarchy 30 to the order of the chargeable items having the identified procedural codes in the chargeable item database 20 when the chargeable items are ordered according to rank. The report may summarize or identify any updates that are or that should be made to the chargeable item database. The results of the request or comparison may be displayed in a format that can be exported to a software-based file such as a Microsoft Excel® file.

Optionally, the system 10 further comprises a duplicate database 25 that is a duplicate of the chargeable item database 20 and that is used to perform the comparison to the hierarchy 30 and update of the chargeable item database 20, as shown in FIG. 1. The processor uses instructions to create the duplicate database 25, which is stored on the storage medium 45 and replaces or overwrites any preceding duplicate database stored therein. Following the comparison and updates, if any, the processor then uses instructions to export the updated price from the duplicate database 25 to the chargeable item database 20 to implement the update to the charged price in the chargeable item database 20.

In order to display textual and graphical information, the system contains the graphics subsystem and the output display (not shown). In an example, the readable formats are displayed on an output display. The output display may include a cathode ray tube display or a liquid crystal display. The graphics subsystem receives textual and graphical information and processes the converted requested update and corresponding data entry from the duplicate database for display on the output display. A graphical user interface (GUI) designed to collect certain information regarding data entries or chargeable items can be used to facilitate entry of the requested update and the corresponding data entry.

The system 10 may further include a mass storage device, peripheral devices, portable storage medium drives, input control devices, a graphics subsystem, and an output display (not shown). The computer system may be connected through one or more data transport means such as a network 50, for example. For example, the processor and the main memory may be connected via a local microprocessor bus, and the mass storage device, peripheral devices, portable storage medium drives, and graphics subsystem may be connected via one or more input/output (I/O) busses. The mass storage device, which may be implemented with a magnetic disk drive or an optical disk drive, is a non-volatile storage device for storing data and instructions for use by the processor. In the software embodiment, the mass storage device stores the information software for loading to the main memory.

The system 10 optionally comprises an input device for inputting the request. The input device has an input control device that provides a portion of the user interface for a user of the system and an input display. Examples of the input control device are an alpha numeric keypad for inputting alpha numeric and other information, or a cursor control device such as a mouse, a trackball, a stylus, or cursor direction keys. In order to display textual and graphic information, the computer system contains the graphics subsystem and the input display. Examples of the input display include a cathode ray tube display or a liquid crystal display. The graphics subsystem receives textual and graphical information and processes the submitted input for display on the input display. A graphical user interface (GUI) that is designed to collect certain information regarding chargeable items can be used to facilitate entry or input. The input device is optionally a software or web-based application that enables the authorized user to submit input, including the review request or a search request to search the duplicate database.

Figure 2:
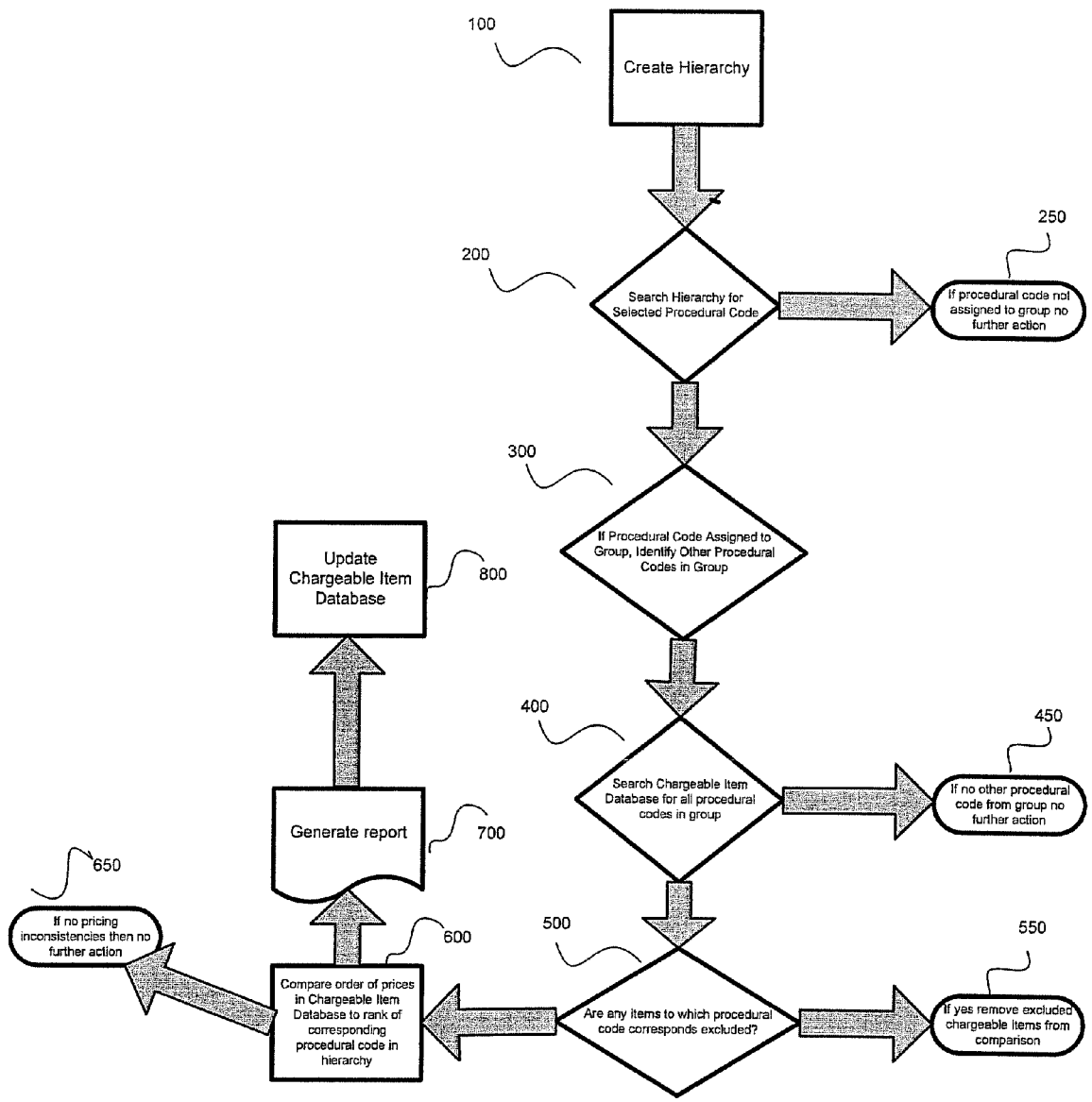
FIG. 2 is a flowchart illustrating an embodiment of a method for hierarchically pricing chargeable items.

In another embodiment, a computer-assisted method of hierarchical pricing is disclosed. An example of the method of hierarchical pricing is shown in FIG. 2. In a first step 200, the hierarchy is searched for a selected procedural code. If the selected procedural code is not assigned to one of the groups in the hierarchy, then no further action is required, as shown in step 250. If the selected procedural code is assigned to a group in the hierarchy, then related procedural codes in that group are identified, as in step 300. Next, in step 400, the chargeable item database is searched for all of the procedural codes in the group. If no other procedural codes from the group are entered in the chargeable item database, then no further action is required, as in step 450. If at least one other procedural code from the group is entered in the chargeable item database, then in step 500 it is determined if any of the chargeable items having the at least one other procedural code have an exclusionary flag. If any such item does have an exclusionary code, then in step 550 that chargeable item is excluded from the comparison and hierarchical pricing and consequently from any updates. In step 600, the charged price of each of the unexcluded chargeable items having the procedural codes in the group is ordered in an order, such as for example an ascending or a descending order, and compared to the rank of the corresponding procedural code in the hierarchy. If the comparison does not find any pricing inconsistencies relative to the ranks, then no further action is required, as in step 650. If there are pricing inconsistencies, then in optional step 700 a report is generated, as described above. The report may be generated following any of steps 100-700 above. In the example shown in FIG. 2, the report is generated following the comparison made in step 600. Optionally, in step 800 the inconsistent charged price(s) for the chargeable item(s) in the chargeable item database are updated to reflect the rank of the corresponding procedural code in the hierarchy. Optionally, the disclosed method of hierarchical pricing comprises the further step 100 of creating the hierarchy, as described above.

SPECIFIC EXAMPLE

Table 1 provides the data entries for four chargeable items having item identifiers of XX1, XX2, XX3, and XX4. Table 1 also provides the hierarchy for the group AA1 of procedural codes. Chargeable items XX1, XX2, XX3, and XX4 have related procedural codes 93000, 93005, 93010, and 93010, respectively. Item XX3 is designated with an exclusionary code "T," to exclude Item XX3 from all comparisons and/or updates. Therefore, any price updates to chargeable items based on the hierarchy of group AA1 and ranks therein will not be implemented for Item XX3 and the charged price will remain at $30. Table 1 also provides the hierarchy for Group AA1, including the rank identifier for each procedural code therein. In the example below, the ascending order of the charged price of the chargeable items in Group AAI is compared to the rank identifier for each of the chargeable items.

TABLE 1

| Item Identifier | Description | Procedural Code | Exclusionary Code | Charged Price | Group Identifier | Rank Identifier |
|---|---|---|---|---|---|---|
| XX1 | ECG plus interpretation | 93000 | F | $150 | AA1 | 3 |
| XX2 | ECG | 93005 | F | $175 | AA1 | 2 |
| XX3 | ECT interpretation only, contract | 93010 | T | $ 30 | AA1 | 1 |
| XX4 | ECG interpretation only | 93010 | F | $ 40 | AA1 | 1 |

In this example, the instructions instruct that the charged price for each chargeable item be ordered in an ascending order according to the rank number assigned to the corresponding procedural code for procedural codes in Group AA1. The instructions will utilize the equations set forth in Appendix A attached hereto to compare the procedural code's rank in the hierarchy and the ascending pricing order of related chargeable items in the chargeable item database. In this example, item XX1 is for an ECG tracing and interpretation of that tracing plus item XX2 is for the ECG tracing only without interpretation. Item XX3 is for interpretation of an ECG tracing and is preformed on a contract basis. As indicated by the "T" exclusionary code, item XX3 is excluded and therefore is not considered in the group and rank comparison. Item XX4 is also for interpretation of an ECG tracing, but is not performed on a contract basis. The corresponding procedural codes are listed for each item. Items XX1-XX4 are each grouped in group AA1. Items XX4, XX2, and XX1 are ranked 1, 2, 3, respectively, in the hierarchy, but the charged prices for items XX4, XX2, and XX1 are $40, $175, and $150, respectively. Therefore, these items are not priced in the chargeable item database according to their assigned rank in the hierarchy. If the items were priced according to rank, item XX1 would have a higher price than item XX2. Optionally, as described above, a report is generated that summarizes the comparison and identifies the pricing discrepancy. The charged price for at least one of items XX1, XX2, or XX4 is optionally updated, as described above.

Various embodiments of the present invention may be implemented on computer-readable media. The terms "computer-readable medium" and "computer-readable media" in the plural as used herein may include, for example, magnetic and optical memory devices such as diskettes, compact discs of both read-only and writeable varieties, optical disk drives, hard disk drives, etc. A computer-readable medium may also include memory storage that can be physical, virtual, permanent, temporary, semipermanent and/or semi-temporary. A computer-readable medium may further include one or more data signals transmitted on one or more carrier waves.

While embodiments of the invention have been shown and described with particularity in connection with the accompanying drawings, the invention may be otherwise embodied within the scope of the following claims.

We claim:

1. A computer-assisted method of hierarchical pricing, said method comprising the steps of:
    a. creating a hierarchy comprising a plurality of groups, each said group having at least one procedural code that corresponds to a chargeable item;
    b. for each group, sequentially ordering said procedural codes in said group in a first sequential order that provides a comparative value for each of said chargeable items relative to said other chargeable items in said group;
    c. for each group, assigning a ranked character to each said procedural code that symbolizes said first sequential order, wherein each said ranked character is derived from a scale having a total population equal to the total number of procedural codes comprising said group;
    d. searching said hierarchy for a selected procedural code;
    e. identifying all related procedural codes in said group to which said selected procedural code is assigned;
    f. performing a computer-assisted search of a healthcare providers chargeable item database to identify all of said procedural codes in said group to which said selected procedural code is assigned;
    g. sequentially, by a computer, ordering said procedural codes identified in said chargeable item database in a second sequential order according to price;
    h. comparing, by a computer, said first and second sequential orders; and
    i. updating, by a computer, a price of said chargeable items in said chargeable item database having said identified procedural codes to price said chargeable items according to said first sequential order.

2. A method as set forth in claim 1 wherein said hierarchy is stored in a second database.

3. A method as set forth in claim 1 wherein at least one of said procedural codes identified in said chargeable item database is excluded from said step of comparing.

4. A method as set forth in claim 1 further comprising a duplicate database that stores a duplicate copy of each of said hierarchy and said chargeable item database.

5. A method as set forth in claim 4 wherein said steps of searching said hierarchy and searching said chargeable item database are performed in said duplicate database.

6. A method as set forth in claim 1 further comprising the step of generating a report that summarizes a comparison of said first and second sequential orders.

7. A method as set forth in claim 1 wherein said chargeable item database is selected from the group consisting of a Chargemaster, a product list, and a Service Master.

8. A method as set forth in claim 1 wherein said chargeable item database is a Chargemaster.

9. A method as set forth in claim 1 wherein said chargeable item database is a product list.

10. A method as set forth in claim 1 wherein said chargeable item database is a Service Master.

11. A method as set forth in claim 1 wherein said at least one procedural code is selected from the group consisting of a Current Procedural Terminology code, a HCFA Common Procedure Coding System code, an International Classification of Disease code, an internal code, and a private insurer's code.

12. A method as set forth in claim 1 wherein said at least one procedural code is a Current Procedural Terminology code.

13. A method as set forth in claim 1 wherein said at least one procedural code is a HCFA Common Procedure Coding System code.

14. A method as set forth in claim 1 wherein said at least one procedural code is an International Classification of Disease code.

15. A hierarchical pricing system for use by a healthcare provider, said system comprising:
    a. a hierarchy, stored on a computer readable media, comprising a plurality of groups, each said group having at least one procedural code that corresponds to a chargeable item, wherein said procedural codes in each said group are sequentially ordered in a first sequential order that provides a comparative value for each of said chargeable items relative to said other chargeable items in said group, and wherein a ranked character is assigned to each of said chargeable items in each said group that symbolizes said first sequential order, each said ranked character being derived from a scale having a total population equal to the total number of procedural codes comprising said group; and
    b. a processor configured to:
    i. search said hierarchy for a selected procedural code;
    ii. identify all of said procedural codes in said group to which said selected procedural code is assigned;
    iii. search a healthcare provider's chargeable item database to identify all of said procedural codes in said group to which said selected procedural code is assigned;
    iv. sequentially order said procedural codes identified in said chargeable item database in a second sequential order according to price;
    v. compare said first and second sequential orders to derive a comparison; and
    vi. update a price of said chargeable items in said chargeable item database having said identified procedural codes to price said chargeable items according to said first sequential order.

16. A system as set forth in claim 15 wherein said processor is further configured to recognize an exclusionary code that excludes at least one of said procedural codes identified in said chargeable item database from said comparison.

17. A system as set forth in claim 15 further comprising a duplicate database that stores a duplicate copy of each of said hierarchy and said chargeable item database, said duplicate database being used by said processor to perform said searches and comparison.

18. A system as set froth in claim 15 wherein said processor is further configured to generate a report that summarizes said comparison.

19. A system as set forth in claim 15 wherein said chargeable item database is selected from the group consisting of a Chargemaster, a product list, and a Service Master.

20. A system as set forth in claim 15 wherein said chargeable item database is a Chargemaster.

21. A system as set forth in claim 15 wherein said chargeable item database is a product list.

22. A system as set forth in claim 15 wherein said chargeable item database is a Service Master.

23. A system as set forth in claim 15 wherein said procedural code is selected from the group consisting of a Current Procedural Terminology code, a HCFA Common Procedure Coding System code, an International Classification of Disease code, an internal code, and a private insurer's code.

24. A system as set forth in claim 15 wherein said procedural code is a Current Procedural Terminology code.

25. A system as set forth in claim 15 wherein said procedural code is a HCFA Common Procedure Coding System code.

26. A system as set forth in claim 15 wherein said procedural code is an International Classification of Disease code.

27. A hierarchical pricing apparatus for use by a healthcare provider, said apparatus comprising:
   a. means for creating a hierarchy comprising a plurality of groups, each said group having at least one procedural code that corresponds to a chargeable item;
   b. means for sequentially ordering said procedural codes in each said group in a first sequential order that provides a comparative value for each of said items relative to said other items in said group;
   c. means for assigning a ranked character to each said procedural code in each said group, said ranked character symbolizing said first sequential order, wherein each said ranked character is derived from a scale having a total population equal to the total number of procedural codes comprising said group;
   d. means for searching said hierarchy for a selected procedural code;
   e. means for identifying all of said procedural codes in said group to which said selected procedural code is assigned;
   f. means for searching a healthcare provider's chargeable item database to identify all of said procedural codes in said group to which said selected procedural code is assigned;
   g. means for sequentially ordering said procedural codes identified in said chargeable item database in a second sequential order according to price;
   h. means for comparing said first and second sequential orders; and
   i. means for updating a price of said chargeable items in said chargeable item database having said identified procedural codes to price said chargeable items according to said first sequential order.

28. An apparatus as set forth in claim 27 wherein said chargeable item database is at least one of a Chargemaster, a product list, or a Service Master.

29. An apparatus as set forth in claim 27 wherein said procedural code is at least one of a Current Procedural Terminology code, a HCFA Common Procedure Coding System code, or an International Classification of Disease code.

30. A computer readable medium having stored therein instructions which, when executed by a processor, cause the processor to:
   a. create a hierarchy comprising a plurality of groups, each said group having at least one procedural code that corresponds to a chargeable item;
   b. sequentially order said procedural codes each said group in a first sequential order that provides a comparative value for each of said items relative to said other items in said group;
   c. assign a ranked character to each said procedural code in each said group, said ranked character symbolizing said first sequential order, wherein each said ranked character is derived from a scale having a total population equal to the total number of procedural codes comprising said group;
   d. search said hierarchy for a selected procedural code;
   e. identify all of said procedural codes in said group to which said selected procedural code is assigned;
   f. search a healthcare provider's chargeable item database to identify all of said procedural codes in said group to which said selected procedural code is assigned;
   g. sequentially order said procedural codes identified in said chargeable item database in a second sequential order according to price;
   h. compare said first and second sequential orders; and
   i. update a price of said chargeable items in said chargeable item database having said identified procedural codes to price said chargeable items according to said first sequential order.

31. A computer readable medium as set forth in claim 30 wherein said chargeable item database is at least one of a Chargemaster, a product list, or a Service Master.

32. An computer readable medium as set forth in claim 30 wherein said procedural code is at least one of a Current Procedural Terminology code, a HCFA Common Procedure Coding System code, or an International Classification of Disease code.

* * * * *